United States Patent
Hirose et al.

(10) Patent No.: US 8,972,151 B2
(45) Date of Patent: Mar. 3, 2015

(54) TWO-CYCLE ENGINE

(75) Inventors: Takayuki Hirose, Aioi (JP); Takeshi Yamada, Tokyo (JP); Yasunori Ashikaga, Yokohama (JP); Takayuki Yamada, Yokohama (JP); Takahiro Kuge, Yokohama (JP); Takahiro Takimoto, Tatsuno (JP); Mamoru Nomura, Himeji (JP)

(73) Assignee: IHI Corporation (JP)

( * ) Notice: Subject to any disclaimer, the term of this patent is extended or adjusted under 35 U.S.C. 154(b) by 25 days.

(21) Appl. No.: 13/813,434

(22) PCT Filed: Aug. 4, 2011

(86) PCT No.: PCT/JP2011/067842
§ 371 (c)(1),
(2), (4) Date: Jan. 31, 2013

(87) PCT Pub. No.: WO2012/018071
PCT Pub. Date: Feb. 9, 2012

(65) Prior Publication Data
US 2013/0133624 A1 May 30, 2013

(30) Foreign Application Priority Data

Aug. 5, 2010 (JP) .................................. 2010-176002
Sep. 8, 2010 (JP) .................................. 2010-201041

(51) Int. Cl.
*F02B 25/04* (2006.01)
*F02M 51/06* (2006.01)
(Continued)

(52) U.S. Cl.
CPC ................ *F02M 51/06* (2013.01); *F02B 25/04* (2013.01); *F02D 19/10* (2013.01);
(Continued)

(58) Field of Classification Search
USPC .................. 701/105; 123/65 A, 73 C, 73 CA
See application file for complete search history.

(56) References Cited

U.S. PATENT DOCUMENTS 5,085,193 A * 2/1992 Morikawa ...................... 123/458
6,035,825 A    3/2000 Worth ............................ 123/357

(Continued)

FOREIGN PATENT DOCUMENTS

CN    1472425 A    2/2004
EP    1378644 A2   1/2004
(Continued)

OTHER PUBLICATIONS

International Search Report dated Aug. 30, 2011 issued in connection with corresponding International Patent Application No. PCT/JP2011/067842.

(Continued)

Primary Examiner — Erick Solis
(74) Attorney, Agent, or Firm — Ostrolenk Faber LLP

(57) ABSTRACT

Disclosed herein is a two-cycle engine that includes an exhaust port which is opened and closed at one end portion in a longitudinal direction of a cylinder; a scavenging port which is opened and closed at the other end portion in the longitudinal direction of the cylinder; and a fuel injection port which injects a fuel into the cylinder provided between the exhaust port and the scavenging port, wherein the fuel begins to be injected in a state in which at least any one of the exhaust port and the scavenging port is opened.

9 Claims, 8 Drawing Sheets

(51) Int. Cl.
*F02D 19/10* (2006.01)
*F02M 21/02* (2006.01)
*F02D 19/06* (2006.01)

(52) U.S. Cl.
CPC ...... *F02M 21/0212* (2013.01); *F02M 21/0275* (2013.01); *F02D 19/061* (2013.01); *F02D 19/0689* (2013.01); *F02D 19/0692* (2013.01); *Y02T 10/36* (2013.01); *Y02T 10/32* (2013.01)
USPC .................... 701/105; 123/73 C; 123/73 CA; 123/65 A

(56) References Cited

U.S. PATENT DOCUMENTS

| | | | |
|---|---|---|---|
| 7,117,830 B1 | 10/2006 | Boyer | 123/90.15 |
| 7,894,974 B2 * | 2/2011 | Bahner et al. | 701/105 |
| 7,975,659 B2 * | 7/2011 | Cerreto | 123/73 C |
| 8,561,581 B2 * | 10/2013 | Taylor | 123/54.1 |

FOREIGN PATENT DOCUMENTS

| | | |
|---|---|---|
| EP | 1380737 A1 | 1/2004 |
| JP | 05-332200 | 12/1993 |
| JP | 06-026390 | 2/1994 |
| JP | 08-291769 | 11/1996 |
| JP | 2000-508400 | 7/2000 |
| JP | 2003-129891 | 5/2003 |
| JP | 2009-532615 | 9/2009 |
| WO | WO 97/39230 | 10/1997 |
| WO | WO2007/115580 | 10/2007 |
| WO | WO 2012/043655 | 4/2012 |
| WO | WO 2012/057310 | 5/2012 |

OTHER PUBLICATIONS

European Search Report, dated May 20, 2014, issued in corresponding European Application No. EP11814696.8. Total 6 pages.
Chinese Office Action and Search Report dated Nov. 15, 2014 in corresponding Chinese Patent Application No. 201180038100.8 (8 pages).

* cited by examiner

FIG. 6B    --Prior Art--

TWO-CYCLE ENGINE

CROSS-REFERENCE TO RELATED APPLICATIONS

The present application is a 35 U.S.C. §§371 national phase conversion of PCT/JP2011/067842, filed Aug. 4, 2011, which claims priority of Japanese Patent Application No. 2010-176002, filed Aug. 5, 2010, and No. 2010-201041, filed Sep. 8, 2010, the contents of which are incorporated herein by reference. The PCT International Application was published in the Japanese language.

TECHNICAL FIELD

The present invention relates to a two-cycle engine, and particularly, to a two-cycle engine which directly injects (performs a direct injection of) a fuel into a cylinder.

BACKGROUND ART

A two-cycle engine (also referred to as a "two-stroke engine") is a reciprocating engine in which intake, compression, combustion, and exhaust strokes make one cycle whenever a piston reciprocates once within a cylinder. The two-cycle engine generally includes a fuel injection port such as an injector within the cylinder and injects a fuel into a combustion chamber in a state of closing a scavenging port and an exhaust port, thereby preventing blow-by of the fuel.

As such a two-cycle engine, a two-cycle reformed gas engine disclosed in the following Patent Document 1 is known. The two-cycle engine is a uniflow type two-cycle engine which includes an exhaust port and a scavenging port at respective upper and lower portions of a cylinder. The two-cycle engine also injects a reformed gas into a combustion chamber during a compression stroke in which the combustion chamber is closed by a piston positioned further upward than the scavenging port after the completion of exhaust.

The uniflow type two-cycle engine of the related art will be described in detail with reference to FIGS. 7 and 8. FIG. 7 is a view illustrating a schematic configuration at the time of a scavenging stroke in the two-cycle engine according to the related example. FIG. 8 is a view illustrating a schematic configuration at the time of gas combustion (explosion) in the two-cycle engine according to the related example. A flammable gas may be used as a main fuel of the two-cycle engine. The following description of the related art will be given of a case of using LNG (Liquefied Natural Gas) as the main fuel of the flammable gas.

The two-cycle engine includes a tubular cylinder liner 4b, a housing 10 which engages a stepped portion on an outer periphery of the cylinder liner 4b to a central opening portion of an upper wall 2a and retains the cylinder liner 4b, a scavenging chamber 12 which is mounted in an opening portion 2b open to the right side in the figure of the housing 10, and a hollow cylinder head 4a mounted on an upper surface of the cylinder liner 4b. Furthermore, the two-cycle engine includes an exhaust valve cage 55 which is mounted to a central opening portion of the cylinder head 4a from above.

A cylindrical piston 3 is vertically movably fitted to a hollow portion (inner periphery) of the cylinder liner 4b. The piston 3 is retained in the cylinder liner 4b and the housing 10 by retaining a piston rod 70 extending downward in a stuffing box 80 which is mounted at a center of a flange portion 2c provided at the inner side beneath the housing 10. A plurality of scavenging ports 9 is formed on side walls of the cylinder liner 4b while facing a space 11 leading to the opening portion 2b of the housing 10. The scavenging ports 9 permit air to be introduced from the space 11 of the housing 10 into the cylinder liner 4b in a state in which the piston 3 is at a bottom dead center as shown in FIG. 7.

The cylinder head 4a is installed with a fuel injection port 13 and a pilot injection valve 5 which are obliquely directed to each other toward a combustion chamber 100 formed in a lower portion of the cylinder head 4a. The exhaust valve cage 55 is formed with an exhaust port 6 which is obliquely directed upward from the bottom open to the combustion chamber 100. In addition, the exhaust valve cage 55 includes an exhaust valve spindle 140 which has an exhaust valve 7 at a lower end portion thereof and is axially supported to be vertically movable. The exhaust valve 7 opens and closes the combustion chamber 100 and the exhaust port 6. The exhaust valve spindle 140 is vertically moved by an exhaust valve drive unit 8, and opens and closes the combustion chamber 100 and the exhaust port 6 by the exhaust valve 7.

As shown in FIG. 8, the fuel injection port 13 is connected with an LNG tank 160 via a high pressure pump 170, an evaporator 180, and a pressure regulating valve 19. The high pressure pump 170 is driven by an electric motor 20. In addition, the pilot injection valve 5 is connected to a fuel injection pump 21.

Next, an operation of the two-cycle engine having such a configuration will be described.

Air supplied from the scavenging chamber 12 is introduced from the space 11 of the housing 10 into the cylinder liner 4b in a state in which the piston 3 is at the bottom dead center at the time of the scavenging stroke shown in FIG. 7. In addition, a combustion gas remaining in the combustion chamber 100 is exhausted from the exhaust port 6 of the exhaust valve cage 55 to the outside during an open state of the exhaust valve 7 at the same time. Thereafter, when the piston 3 is raised (moves toward the combustion chamber 100) in the cylinder liner 4b and the exhaust valve 7 becomes a closed state, the air introduced into the cylinder liner 4b is compressed.

FIG. 8 illustrates a state in which the piston 3 reaches up to a top dead center and the air is compressed to the maximum. In this state, after LNG supplied from the LNG tank 160 is pressured using the high pressure pump 170 driven by the electric motor 20 and is gasified by the evaporator 180, the LNG is injected from the fuel injection port 13 into the combustion chamber 100 while the pressure of the LNG is regulated by the pressure regulating valve 19.

At the same time, a liquid fuel supplied from a liquid fuel tank (not shown) is supplied to the pilot injection valve 5 by the fuel injection pump 21 and injected from the pilot injection valve 5 toward the combustion chamber 100. The liquid fuel self-ignites within the combustion chamber 100 and this flame allows the high pressure LNG injected into the combustion chamber 100 to ignite (explode). By this explosive power (pressure), the piston 3 falls (moves toward the bottom dead center) at high speed in the cylinder liner 4b. Thus, it becomes a state shown in FIG. 7.

Meanwhile, as the arts related to the above two-cycle engine, there are techniques described in Patent Documents 2 and 3 in addition to Patent Document 1.

CITATION LIST

Patent Document

[Patent Document 1] Japanese Unexamined Patent Application, First Publication No. H8-291769

[Patent Document 2] Japanese Unexamined Patent Application, First Publication No. H5-332200

[Patent Document 3] Published Japanese Translation No. 2000-508400 of the PCT International Publication

SUMMARY OF INVENTION

Technical Problem

In the related art, the fuel is injected into the combustion chamber during the compression stroke in which the exhaust gas hardly exists within the combustion chamber after the completion of exhaust. However, the inner portion of the combustion chamber is in a high pressure state during the compression stroke. For this reason, in order to inject the fuel into the combustion chamber, a high output pressure rising device to inject the fuel at a higher pressure is required.

The present invention has been made in view of the above-mentioned problem, and an object thereof is to provide a two-cycle engine capable of directly injecting a fuel into a cylinder without using a high pressure.

In addition, as described above, in the related two-cycle engine using the LNG as the fuel, the LNG is directly injected to compressed air of the combustion chamber and is combusted. In this case, the LNG should be pressured at a pressure equal to or more than the compressed air. The LNG is generally pressured to the extent of 250 bars and the combustion form thereof is diffusion combustion.

Incidentally, a high pressure pump having a high capacity is required to pressure the LNG at a high pressure, thereby increasing costs. Also, an expensive evaporator cannot but be adopted in order to be able to withstand a high pressure. Furthermore, a high pressure gas pipe is required for connection from the high pressure pump to the two-cycle engine with the consequence that an increase of costs is caused. In addition, the high pressure pump having the high capacity also needs large driving power, thereby causing an increase in running cost.

In a case of installing the high pressure gas pipe, there is difficulty in designing and manufacturing a reciprocating internal combustion engine having a large vibration. Moreover, there is a problem in that a possibility of a gas leakage is increased due to the high pressure.

The present invention has been made in view of the above-mentioned problem, and an object thereof is to provide a two-cycle engine at low cost with high reliability.

Solution to Problem

In order to solve the above-mentioned problem, a two-cycle engine according to an aspect of the present invention includes an exhaust port which is opened and closed at one end portion in a longitudinal direction of a cylinder; a scavenging port which is opened and closed at the other end portion in the longitudinal direction of the cylinder; and a fuel injection port to inject a fuel into the cylinder between the exhaust port and the scavenging port, wherein the fuel begins to be injected in a state in which at least any one of the exhaust port and the scavenging port is opened. In addition, in this case, a fuel injection control unit may be provided which allows the fuel injection port to be in an open state before an exhaust gas in the cylinder is completely exhausted from the exhaust port and after an intake fresh air layer suctioned from the scavenging port into the cylinder reaches a fuel injection position of the fuel injection port.

According to the adoption of such a configuration, the aspect of the present invention begins the injection of the fuel before the exhaust gas in the cylinder is completely exhausted, that is, in a low pressure state in which at least any one of the exhaust port and the scavenging port is opened. Thus, the fuel may be injected into the combustion chamber at a pressure lower than the related art. In addition, in the aspect of the present invention, a fuel injection start time is controlled to be after the intake fresh air layer suctioned from the scavenging port into the cylinder reaches the fuel injection position of the fuel injection port. Thus, since the injected fuel may be prevented from coming into contact with the high temperature exhaust gas which partially remains in the cylinder, preignition may be prevented and the engine may be stably driven.

In addition, in an aspect of the present invention, the fuel injection control unit may allow the fuel injection port to be in an open state after an intake fresh air layer suctioned from the scavenging port into the cylinder reaches a fuel injection position of the fuel injection port and after a delay time passes so that the intake fresh air layer is formed between an exhaust gas layer and the fuel injection position.

According to the adoption of such a configuration, the aspect of the present invention begins the injection of the fuel after the intake fresh air layer reaches the fuel injection position and the delay time is elapsed. The intake fresh air layer is formed between the exhaust gas layer and the fuel injection position by the delay time. In this case, the intake fresh air layer is interposed between the fuel and the exhaust gas layer, thereby preventing contact between both of the fuel and the exhaust gas layer. Accordingly, according to the aspect of the present invention, the preignition may be more securely prevented.

In addition, in an aspect of the present invention, the fuel injection control unit may allow the fuel injection port to be opened and closed based on an opening degree of at least any one of the exhaust port and the scavenging port.

According to the adoption of such a configuration, the present invention performs the opening and closing control of the fuel injection port based on the opening degree of at least any one of the exhaust port and the scavenging port. It may be possible to estimate what position the intake fresh air layer in the cylinder reaches up to while pushing the exhaust gas layer from the opening degree.

In addition, in an aspect of the present invention, the fuel injection control unit may allow the fuel injection port to be opened and closed based on an opening degree of any one of the exhaust port and the scavenging port, which is opened later than the other one.

According to the adoption of such a configuration, the aspect of the present invention performs the opening and closing control of the fuel injection port based on the opening degree of any one of the exhaust port and the scavenging port, which is opened later than the other one. The estimation of what position the intake fresh air layer in the cylinder reaches up to while pushing the exhaust gas layer significantly depends on the opening degree of any one of the exhaust port and the scavenging port, which is opened later than the other one. Accordingly, according to the aspect of the present invention, the position which the intake fresh air layer reaches may be more accurately estimated.

In addition, in order to achieve the above object, an aspect of the present invention may include, in the two-cycle engine using LNG as a main fuel, a cylinder in which a piston is reciprocally moved, an air supply container (scavenging chamber) which supplies air to an air introduction hole formed on the cylinder, a combustion chamber at an upper portion of the cylinder, a gas injection valve which is mounted to the cylinder above the air introduction hole and injects the LNG, and a pilot injection valve to inject a liquid fuel which ignites a mixed gas of the LNG and the air within the combustion chamber, wherein the LNG is injected from the gas injection valve during a scavenging stroke which compresses the air supplied from the air supply container by the piston.

In addition, in an aspect of the present invention, the injection of the LNG from the gas injection valve may begin before an exhaust valve provided in the combustion chamber is closed, and stop in a state in which the piston closes the gas injection valve.

In addition, in an aspect of the present invention, the LNG may be injected from the gas injection valve in a direction opposite to a swirl flow of the air generated during the scavenging stroke.

In addition, in an aspect of the present invention, there may be a plurality of the air introduction holes and the air introduction holes may have non-uniform opening widths.

In addition, in an aspect of the present invention, the gas injection valve may be mounted to the cylinder in a multistep fashion.

Advantageous Effects of Invention

In accordance with the present invention, in the two-cycle engine that includes the exhaust port which is opened and closed at one end portion in the longitudinal direction of the cylinder, the scavenging port which is opened and closed at the other end portion in the longitudinal direction of the cylinder, and the fuel injection port to inject a fuel into the cylinder between the exhaust port and the scavenging port, the fuel begins to be injected in a low pressure state in which at least any one of the exhaust port and the scavenging port is opened. Thus, the fuel may be injected into the combustion chamber at a pressure lower than that in the related art. In addition, in the present invention, the fuel injection start time is controlled to be after the intake fresh air layer suctioned from the scavenging port into the cylinder reaches the fuel injection position of the fuel injection port. Thus, since the injected fuel may be prevented from coming into contact with the high temperature exhaust gas which partially remains in the cylinder, preignition may be prevented and the engine may be stably driven.

Accordingly, the present invention may provide the two-cycle gas engine capable of directly injecting the fuel into the cylinder without using a high pressure while the preignition is prevented.

In addition, the present invention may provide the two-cycle engine at low cost with high reliability.

BRIEF DESCRIPTION OF DRAWINGS

FIG. 6B is a cross-sectional view illustrating a liner of a scavenging port portion according to the related art for comparison with FIG. 6A.

DESCRIPTION OF EMBODIMENTS

Hereinafter, embodiments of the present invention will be described with reference to the accompanying drawings.

Figure 1:
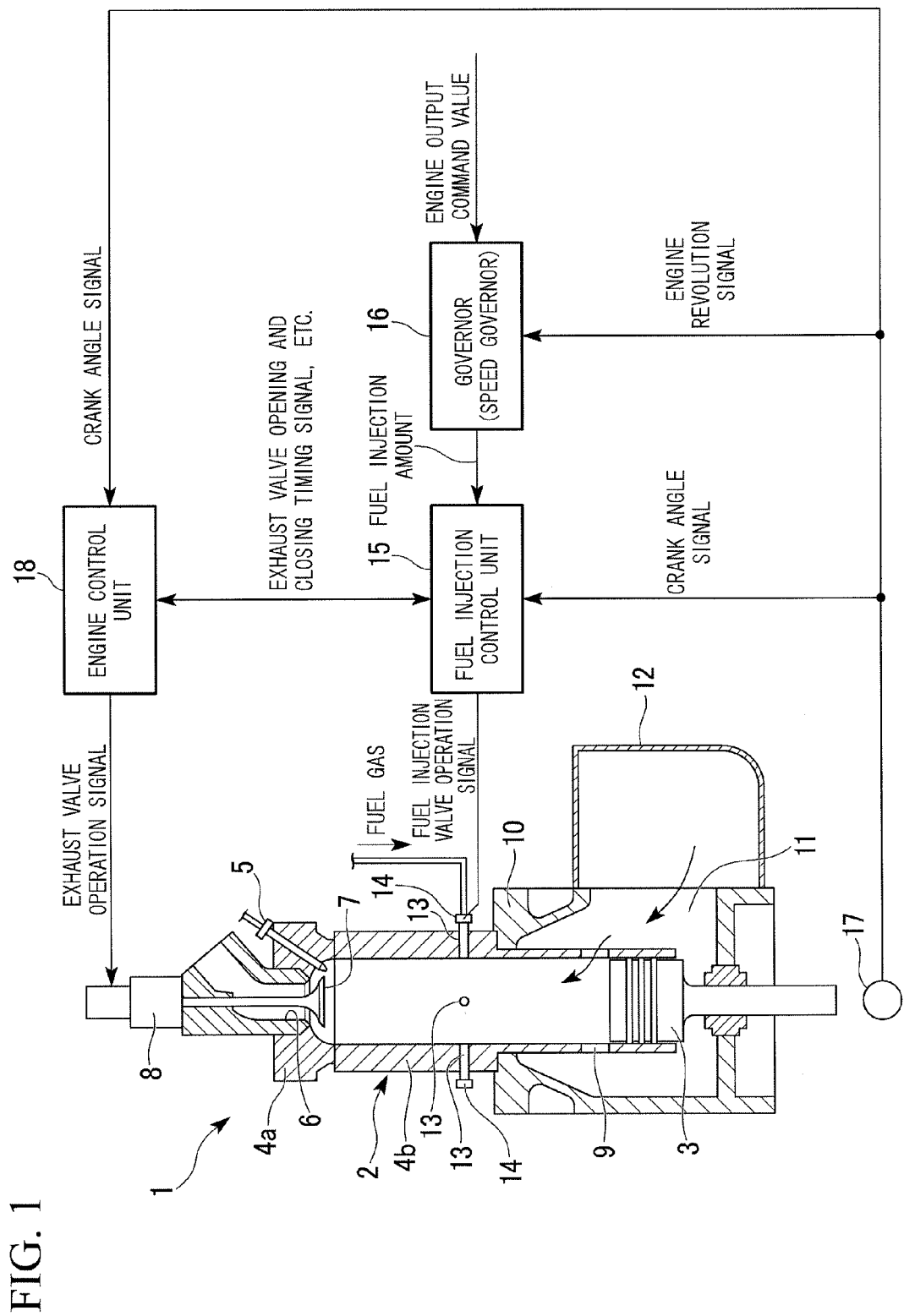
FIG. 1 is a view illustrating an entire configuration of a two-cycle engine according to a first embodiment of the present invention.

FIG. 1 is a view illustrating an entire configuration of a two-cycle engine according to a first embodiment of the present invention.

The two-cycle engine of the present embodiment is, for example, a large uniflow type two-cycle gas engine provided in a ship or the like, and uses LNG (Liquefied Natural Gas) as a fuel. Reference numeral 1 in FIG. 1 denotes an engine body, and a piston 3 connected to a crank mechanism (not shown) reciprocally moves within a cylinder 2. Also, a crosshead type piston having a long stroke is adopted as the piston 3.

The cylinder 2 is provided, at an upper portion thereof (one end portion in a longitudinal direction thereof), with a pilot injection valve 5 and an exhaust port 6. The exhaust port 6 is in the vicinity of a top dead center of the piston 3 and is open at an apex portion of a cylinder head 4a. The exhaust port 6 has an exhaust valve 7. The exhaust valve 7 vertically moves at a predetermined timing by an exhaust valve drive unit 8, and opens and closes the exhaust port 6. An exhaust gas exhausted through the exhaust port 6 is, for example, supplied to the turbine side of a supercharger which is not shown and is then exhausted to the outside.

The cylinder 2 is provided, at a lower portion thereof (the other end portion in the longitudinal direction thereof), with scavenging ports 9. Each of the scavenging ports 9 is opened and closed at a predetermined timing by reciprocal movement of the piston 3.

The scavenging port 9 is in the vicinity of a bottom dead center of the piston 3 and is open at the side portion of a cylinder liner 4b. The scavenging port 9 is enclosed in a space 11 defined by a housing 10.

The housing 10 is connected with a scavenging chamber 12. The scavenging chamber 12 is, for example, supplied with pressured air from the compressor side of the supercharger which is not shown.

The cylinder 2 is provided, at a central belly portion (intermediate portion) thereof, with fuel injection ports 13. The fuel injection ports 13 inject a fuel gas, which is gasified from the LNG, to the inner upper side (combustion chamber) of the cylinder 2, between the exhaust port 6 and the scavenging port 9. The plural fuel injection ports 13 are spaced apart from each other in a circumferential direction of the cylinder liner 4b. Each of the fuel injection ports 13 has a fuel injection valve 14. The fuel injection valve 14 receives a command from a fuel injection control unit 15 and opens and closes the fuel injection port 13, thereby allowing the injection and injection stop of the fuel gas to be performed.

The fuel injection control unit 15 is input with a command related to a fuel injection amount from a governor (speed governor) 16. The governor 16 outputs the fuel injection amount, based on an engine output command value which is input and engine revolution signal from a rotary encoder 17 provided at the crank mechanism which is not shown. In addition, a crank angle signal detected in the rotary encoder 17 is input to the fuel injection control unit 15 and an engine control unit 18.

The engine control unit 18 outputs an exhaust valve operation signal to the exhaust valve drive unit 8 based on the crank angle signal. In addition, an exchange of predetermined information including an exhaust valve opening and closing timing signal is performed mutually between the engine control unit 18 and the fuel injection control unit 15. The fuel injection control unit 15 allows the fuel gas to be injected into the cylinder 2 by a predetermined fuel injection amount at a predetermined timing based on the above inputs.

Specifically, the fuel injection control unit 15 ascertains an opening degree of the exhaust port 6 and an opening degree of the scavenging port 9 based on the crank angle signal and the exhaust valve opening and closing timing signal, outputs a fuel injection valve operation signal to the fuel injection valve 14, and performs opening and closing control of the fuel injection port 13. A fuel injection timing of the fuel gas which causes the fuel injection port 13 to be an open state is set to be before the exhaust gas in the cylinder 2 is completely exhausted from the exhaust port 6 and after an intake fresh air layer suctioned from the scavenging port 9 into the cylinder 2 reaches a fuel injection position of the fuel injection port 13. In addition, the fuel injection timing in the embodiment is further set to be after a delay time passes so that the intake fresh air layer is formed between an exhaust gas layer and the fuel injection position.

Hereinafter, a characteristic fuel injection operation will be described which is performed under the control of the fuel injection control unit 15 with reference to FIGS. 2A to 2I and FIG. 3.

FIGS. 2A to 2I are views for explaining the fuel injection operation of the two-cycle engine according to the embodiment of the present invention. FIG. 3 is a graph illustrating a corresponding relationship between the crank angle and the opening degree (lift amount, opening area, etc.) of each port in the two-cycle engine according to the embodiment of the present invention. In FIGS. 2A to 2I, reference numeral A denotes the exhaust gas layer, reference numeral B denotes the intake fresh air layer, and reference numeral C denotes a premixed gas layer in which the fuel gas is mixed with the air.

Figures 2A, 2B, 2C, 2D, 2E:
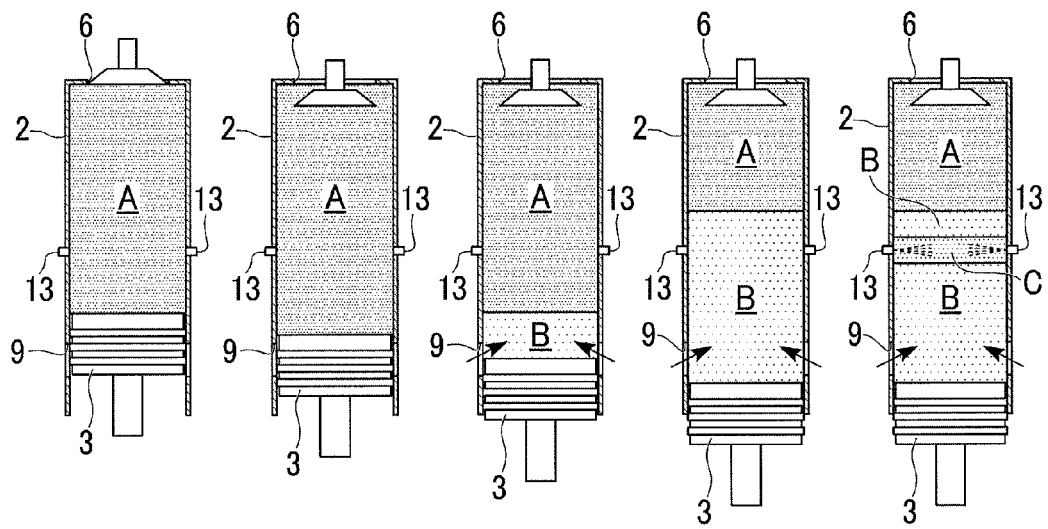
FIG. 2A is a view for explaining a fuel injection operation of the two-cycle engine according to the first embodiment of the present invention.
FIG. 2B is a view for explaining the fuel injection operation of the two-cycle engine according to the first embodiment of the present invention.
FIG. 2C is a view for explaining the fuel injection operation of the two-cycle engine according to the first embodiment of the present invention.
FIG. 2D is a view for explaining the fuel injection operation of the two-cycle engine according to the first embodiment of the present invention.
FIG. 2E is a view for explaining the fuel injection operation of the two-cycle engine according to the first embodiment of the present invention.
Figure 3:
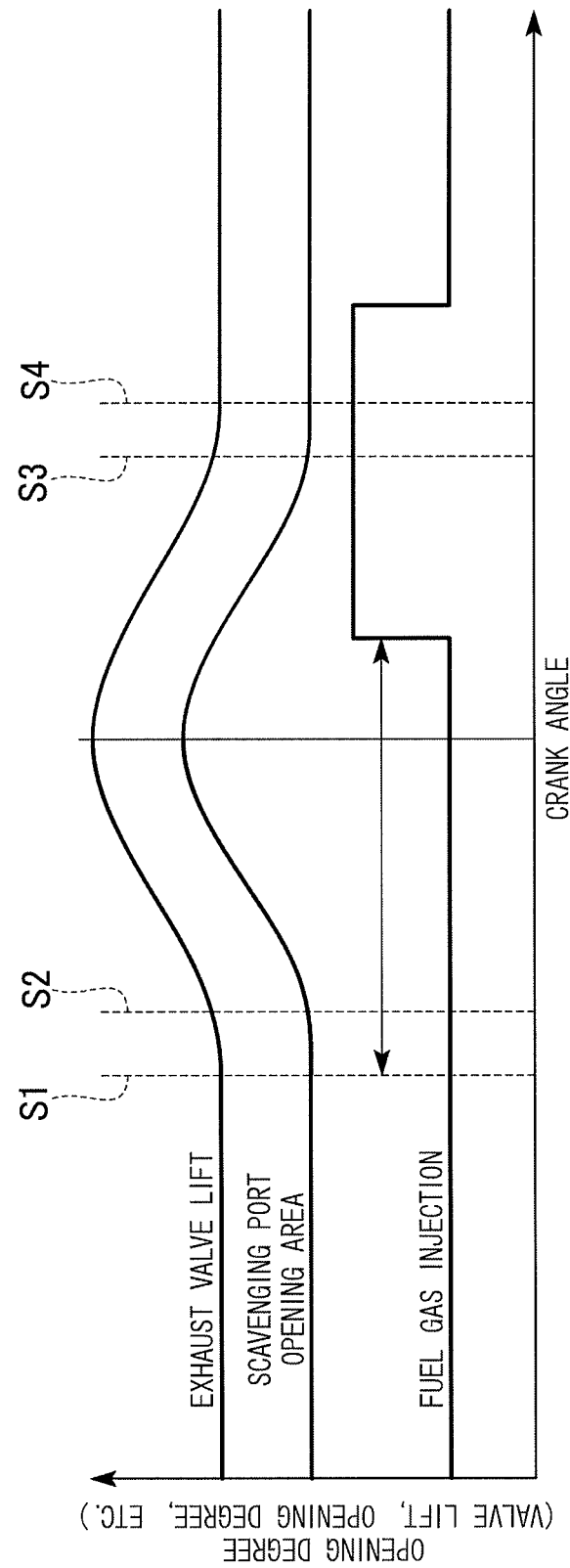
FIG. 3 is a graph illustrating a corresponding relationship between a crank angle and an opening degree of each port in the two-cycle engine according to the first embodiment of the present invention.

FIG. 2A illustrates an expansion stroke after combustion. At this time, the exhaust port 6 and the scavenging port 9 are in a closed state and the inner portion of the cylinder 2 is filled with the exhaust gas layer A.

When the piston 3 is further moved downward from FIG. 2A and the crank angle reaches a predetermined angle, the exhaust valve drive unit 8 is driven by the engine control unit 18 and the exhaust valve 7 is moved downward, and thus the exhaust port 6 is opened (step S1: see FIGS. 2B and 3).

When the piston 3 is further moved downward from FIG. 2B and the crank angle reaches a predetermined angle, the scavenging port 9 in the closed state is opened by the piston 3 (step S2: see FIGS. 2C and 3). Furthermore, when the piston 3 reaches the bottom dead center, the scavenging port 9 is completely opened (see FIG. 2D).

An intake stroke begins from step S2 in which the exhaust port 6 and the scavenging port. 9 are opened. The intake fresh air layer B suctioned from the scavenging port 9 into the cylinder 2 is filled within the cylinder 2 from below toward above while pushing up the exhaust gas layer A.

After the intake fresh air layer B reaches the fuel injection position provided with the fuel injection port 13, the fuel injection valve 14 is driven by the fuel injection control unit 15 and the injection of the fuel gas begins from the fuel injection port 13 (see FIGS. 2E and 3).

At this time, since the exhaust port 6 and the scavenging port 9 are under exhaust in the open state, the inner portion of the cylinder 2 is a low pressure. Accordingly, the fuel gas may be injected into the cylinder 2 from the fuel injection port 13 at a pressure lower than the pressure under compression. Therefore, the fuel gas can be injected into the combustion chamber without provision of a high output pressure rising device.

In this case, however, there is a state in which a high temperature exhaust gas partially remains in the combustion chamber. If the fuel gas is injected into the high temperature exhaust gas layer A so that they come into contact with each other, preignition may occur. For this reason, the fuel injection timing in the embodiment is controlled to be after the intake fresh air layer B suctioned from the scavenging port 9 into the cylinder 2 reaches the fuel injection position of the fuel injection port 13. When the fuel injection timing is after the intake fresh air layer B reaches the fuel injection position of the fuel injection port 13, the injected fuel gas can be prevented from coming into contact with the high temperature exhaust gas which partially remains in the cylinder 2 since the intake fresh air layer B pushes the exhaust gas layer A in the uniflow (unidirectional flow). Consequently, the preignition can be prevented and the engine can be stably driven.

Furthermore, the fuel injection timing in the embodiment is set to be after the intake fresh air layer B reaches the fuel injection position and after the delay time passes so that the intake fresh air layer B is formed between the exhaust gas layer A and the fuel injection position. The intake fresh air layer B formed between the exhaust gas layer A and the fuel injection position is interposed between the exhaust gas layer A and the premixed gas layer C by the delay time, thereby preventing contact between the exhaust gas layer A and the premixed gas layer C (see FIG. 2E). As a specific effect, contact between the fuel gas and the exhaust gas layer A may be prevented by the interposed intake fresh air layer B even when the fuel gas is injected and diffused from the fuel injection port 13 by a predetermined width. Furthermore, by interposing the intake fresh air layer B between the exhaust gas layer A and the premixed gas layer C, it can be possible to prevent unexpected preignition according to infiltration of the exhaust gas into the fuel injection position due to a fluctuation in the interface of the exhaust gas layer A. Accordingly, the intake fresh air layer B is interposed between the exhaust gas layer A and the premixed gas layer C by the delay time, thereby enabling the preignition to be more securely prevented.

It may be possible to estimate what position the intake fresh air layer B reaches up to while pushing the exhaust gas layer A in the cylinder 2 based on at least any one of the opening degree (lift amount) of the exhaust port 6 and the opening degree (opening area) of the scavenging port 9. Since the opening degree of the scavenging port 9 in the embodiment corresponds to the position of the piston 3, namely, the crank angle, the fuel injection timing is set based on an opening timing of the exhaust port 6 (see FIG. 3).

The opening timing of the exhaust port 6 is variable by the exhaust valve drive unit 8, and may be mixed up with an opening timing of the scavenging port 9 depending on a load of the engine. For this reason, the fuel injection timing in the embodiment is set based on the opening timing of the exhaust port 6.

Figures 2F, 2G, 2H, 2I:
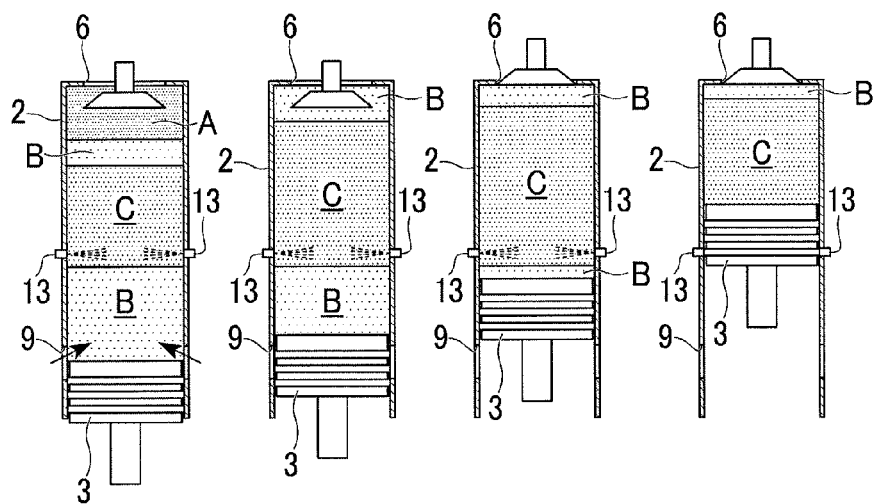
FIG. 2F is a view for explaining the fuel injection operation of the two-cycle engine according to the first embodiment of the present invention.
FIG. 2G is a view for explaining the fuel injection operation of the two-cycle engine according to the first embodiment of the present invention.
FIG. 2H is a view for explaining the fuel injection operation of the two-cycle engine according to the first embodiment of the present invention.
FIG. 2I is a view for explaining the fuel injection operation of the two-cycle engine according to the first embodiment of the present invention.

When the piston 3 begins to be raised past the bottom dead center, the scavenging port 9 begins to be closed (see FIG. 2F). At this time, the fuel continues to be injected and the premixed gas layer C is filled within the cylinder 2 in a state of interposing the intake fresh air layer B between the exhaust gas layer A and the premixed gas layer C.

When the piston 3 is further moved upward from FIG. 2F and the crank angle reaches a predetermined angle, the scavenging port 9 in the open state is closed by the piston 3 (step S3: see FIGS. 2G and 3). In this case, since the exhaust port 6 is not yet closed, the fuel continues to be injected at the low pressure.

When the piston 3 is further moved upward from FIG. 2G and the crank angle reaches a predetermined angle, the exhaust valve 7 is raised to the maximum, the exhaust port 6 is closed, and complete the exhaust (step S4: see FIGS. 2H and 3). In this case, the exhaust gas layer A is almost all exhausted. However, in the embodiment, a margin occurs since the intake fresh air layer B is interposed between the exhaust gas layer A and the premixed gas layer C, and the exhaust port 6 can be closed in a state of blowing a portion of the interposed intake fresh air layer B. Thus, the blow-by of the premixed gas layer C can be prevented while the exhaust gas layer A is almost all exhausted.

A compression stroke begins from step S4 in which the exhaust port 6 and the scavenging port 9 are closed. The fuel continues to be injected up to the first half of the compression stroke before the pressure of the combustion chamber increases. Indeed, the fuel injection is completed before reaching the pressure of performance limits of the pressure rising device. Before the piston 3 at least reaches the fuel injection position, namely, the central belly portion of the cylinder 2, the fuel injection valve 14 is closed by the fuel injection control unit 15 and the fuel injection is completed (see FIG. 2I).

Thereafter, when the piston 3 reaches up to the top dead center and the premixed gas layer C is compressed, the ignition is performed, the exhaust gas generated by the combustion pushes down the piston 3, and returns to a state of FIG. 2A.

As described above, the fuel injection operation is completed in one cycle of the engine.

Accordingly, according to the above-mentioned embodiment, in the uniflow type two-cycle gas engine including the exhaust port 6 which is opened and closed at the upper portion of the cylinder 2, the scavenging port 9 which is opened and closed at the lower portion of the cylinder 2, and the fuel injection port 13 which injects the fuel gas into the cylinder 2 between the exhaust port 6 and the scavenging port 9, the fuel injection begins before the exhaust gas in the cylinder 2 is completely exhausted from the exhaust port 6, that is, in a low pressure state in which at least any one of the exhaust port 6 and the scavenging port 9 is opened, by adopting the configuration of the fuel injection control unit 15 which allows the fuel injection port 13 to be in the open state before the exhaust gas in the cylinder 2 is completely exhausted and after the intake fresh air layer B suctioned from the scavenging port 9 into the cylinder 2 reaches the fuel injection position of the fuel injection port 13. Accordingly, the fuel may be injected into the combustion chamber at a pressure lower than that of the related art. In addition, in the embodiment, the fuel injection start time is controlled to be after the intake fresh air layer B suctioned from the scavenging port 9 into the cylinder 2 reaches the fuel injection position of the fuel injection port 13. Consequently, since the injected fuel may be prevented from coming into contact with the high temperature exhaust gas which partially remains in the cylinder 2, the preignition can be prevented and the engine can be stably driven.

Accordingly, the present embodiment can provide the uniflow type two-cycle gas engine capable of directly injecting the fuel into the cylinder 2 without using a high pressure while the preignition is prevented.

While the preferred embodiment of the invention has been described with reference to the accompanying drawings, the present invention is not limited to the above embodiment. Various shapes, combinations or the like illustrated in the above-mentioned embodiment are an example, and various modifications and variations can be made based on the design requirement and the like without departing from the scope of the present invention.

For example, in the above embodiment, although the configuration has been described in which the fuel injection control unit 15 performs the opening and closing control of the fuel injection port 13 based on the opening degree of the exhaust port 6, the present invention is not limited thereto.

For example, the fuel injection control unit 15 may also perform the opening and closing control of the fuel injection port 13 based on the opening degree of the scavenging port 9, or also perform the opening and closing control of the fuel injection port 13 based on the opening degrees of the exhaust port 6 and the scavenging port 9.

In addition, since the estimation of what position the intake fresh air layer B reaches up to while pushing the exhaust gas layer A significantly depends on the opening degree of any one of the exhaust port 6 and the scavenging port 9, which is opened later than the other one, the fuel injection control unit 15 can also perform the opening and closing control of the fuel injection port 13 based on the opening degree of any one of the exhaust port 6 and the scavenging port 9, which is opened later than the other one.

In addition, since the opening degrees of the exhaust port 6 and the scavenging port 9 depend on the crank angle, the fuel injection control unit 15 can also perform the opening and closing control of the fuel injection port 13 based on the crank angle.

In addition, since the two-cycle engine for a ship as the above embodiment has a form driven while uniformly retaining the engine output, the pressure in the scavenging chamber 12 is almost constant. However, in a case of the two-cycle engine in which the engine output is often varied, there is a case in which the pressure of the intake side of the engine is changed. In this case, the fuel injection control unit 15 may also perform the opening and closing control of the fuel injection port 13 by providing a pressure gage in the scavenging port 9 side of the engine and adding the measured result, for example.

In addition, although the above embodiment has been described with respect to the form which injects the gas fuel, the present invention may also be applied to a form which injects a liquid fuel for example. In addition, the present invention may be applied to a form which uses, for example, an LPG (Liquefied Petroleum Gas), a gas oil, a heavy oil, or other flammable gas as the fuel, instead of using the LNG.

Next, a second embodiment of the present invention will be described with reference to the accompanying drawings.

Figure 4:
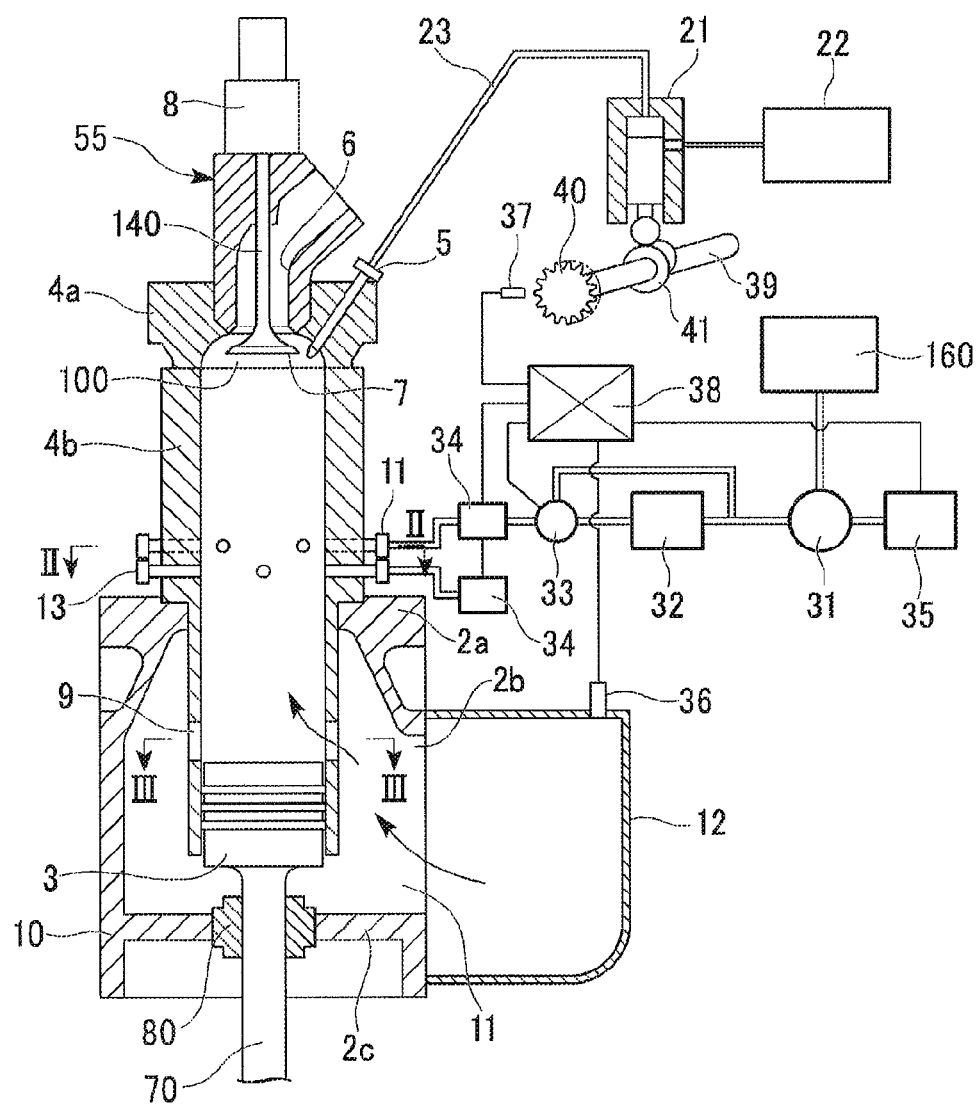
FIG. 4 is a view illustrating a schematic configuration of a two-cycle engine according to a second embodiment of the present invention.
Figure 7:
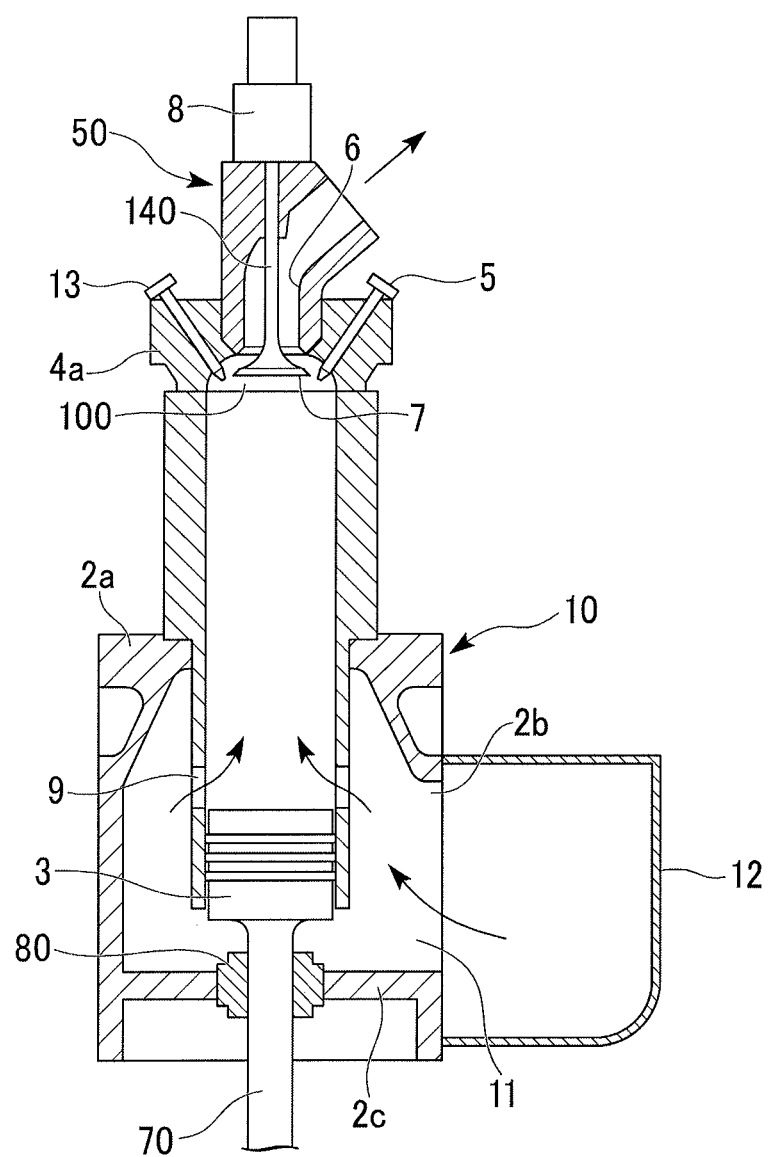
FIG. 7 is a view illustrating a schematic configuration at the time of a scavenging stroke in a two-cycle engine according to the related example.

FIG. 4 is a view illustrating a schematic configuration of a two-cycle engine according to a second embodiment of the present invention. Like reference numerals are given to configurations identical to the related example shown in FIGS. 7 and 8.

The two-cycle engine which uses LNG (Liquefied Natural Gas) as a main fuel has the following configurations. That is, the two-cycle engine includes a tubular cylinder liner (cylinder) 4b, a housing 10 which engages a stepped portion on an outer periphery of the cylinder liner 4b to a central opening portion of an upper wall 2a and retains the cylinder liner 4b, a scavenging chamber (air supply container) 12 which is mounted in an opening portion 2b open to the right side in the figure of the housing 10, and a hollow cylinder head 4a mounted on an upper surface of the cylinder liner 4b. Furthermore, the two-cycle engine includes an exhaust valve cage 55 which is mounted to a central opening portion of the cylinder head 4a from above.

A cylindrical piston 3 is vertically movably (reciprocatably) fitted to a hollow portion (inner peripheral surface) of the cylinder liner 4b. The piston 3 is retained in the cylinder liner 4b and the housing 10 by retaining a piston rod 70 extending downward in a stuffing box 80 which is mounted at a center of a flange portion 2c provided at the inner side beneath the housing 10. A plurality of scavenging ports (air introduction holes) 9 is formed on side walls of the cylinder liner 4b while facing a space 11 leading to the opening portion 2b of the housing 10. Each of the scavenging ports 9 permits air to be introduced from the space 11 of the housing 10 into the cylinder liner 4b in a state in which the piston 3 is at a bottom dead center as shown in FIG. 4.

The cylinder head 4a is installed with a pilot injection valve 5 which is obliquely directed toward a combustion chamber 100 formed in a lower portion of the cylinder head 4a. The exhaust valve cage 55 is formed with an exhaust port 6 which is obliquely directed upward from the bottom open to the combustion chamber 100. In addition, the exhaust valve cage 55 includes an exhaust valve spindle 140 which has an exhaust valve 7 at a lower end portion thereof and is axially supported to be vertically movable. The exhaust valve 7 opens and closes the combustion chamber 100 and the exhaust port 6. The exhaust valve spindle 140 is vertically moved by an exhaust valve drive unit 8, and opens and closes the combustion chamber 100 and the exhaust port 6 by the exhaust valve 7.

The pilot injection valve 5 is connected to a fuel injection pump 21. The fuel injection pump 21 is supplied with a liquid fuel from a liquid fuel tank 22 and supplies the liquid fuel to the pilot injection valve 5 via a fuel high pressure pipe 23. The pilot injection valve 5 may be a direct injection type or a divided chamber type.

Furthermore, the two-cycle engine of the present embodiment adopts the following configurations.

The two-cycle engine of the present embodiment includes any number of fuel injection ports 13, and an injection hole of each fuel injection port 13 is mounted on the cylinder liner 4b to face an inner portion of the cylinder liner 4b. As shown in FIG. 4, the fuel injection port 13 is located above the scavenging port 9. The fuel injection port 13 is connected to an LNG tank 160 via an LNG pump 31, an evaporator 32, a pressure regulating valve 33, and a gas controller 34. The LNG pump 31 is driven by an electric motor 35.

Here, each of the LNG pump 31, the evaporator 32, the pressure regulating valve 33, and the electric motor 35 is a low standard and low cost component having a small capacity and output, compared to the related art. In addition, the gas controller 34 performs ON/OFF control of LNG supply to the fuel injection port 13.

The two-cycle engine of the embodiment includes a control unit (controller) which controls the pressure regulating valve 33, the gas controller 34, and the electric motor 35 by receiving output from a scavenging pressure sensor 36 and a crank angle detection sensor 37. Here, the scavenging pressure sensor 36 is mounted on the surface of the scavenging chamber 12 and detects an air pressure in the scavenging chamber 12.

The crank angle detection sensor 37 faces a crank angle detection gear 40 mounted to one end of a cam shaft 39, and a fuel cam 41 attached to the cam shaft 39 drives the fuel injection pump 21 by vertically moving a piston of the fuel injection pump 21.

Figure 5:
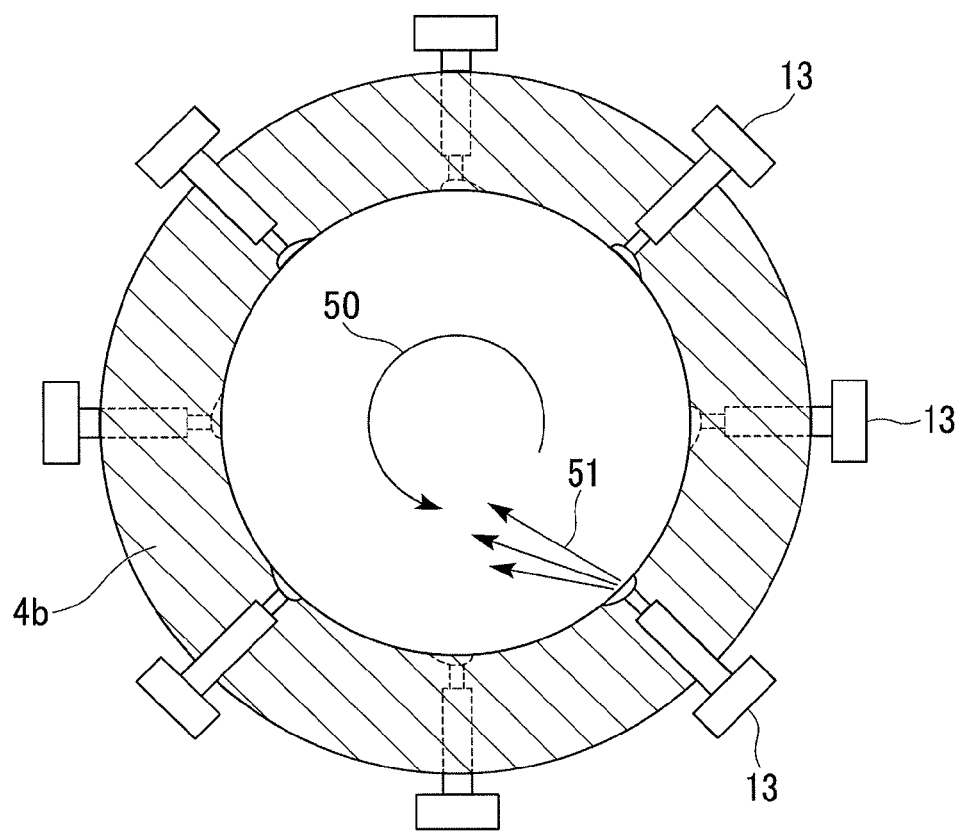
FIG. 5 is a cross-sectional view, when viewed from the top, taken along line II-II of FIG. 4.
Figure 6A:
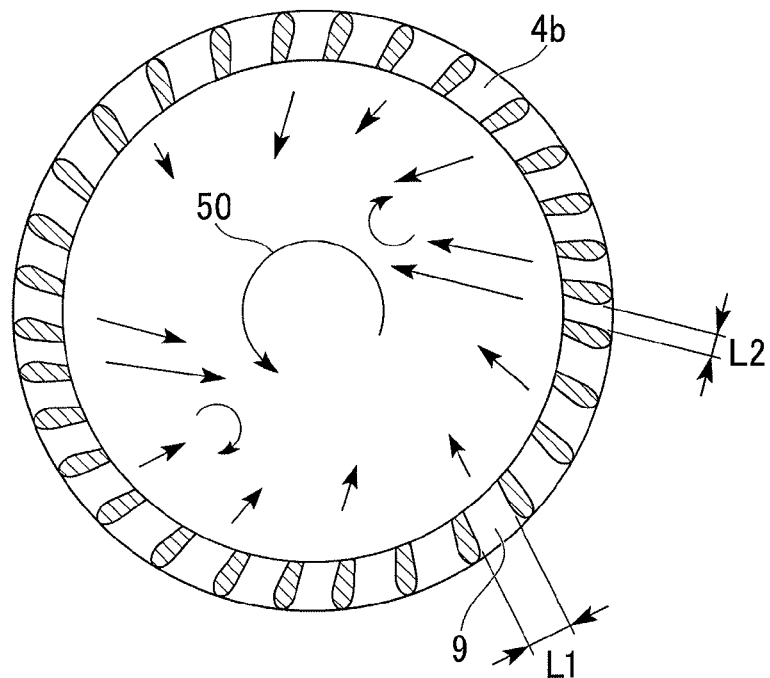
FIG. 6A is a cross-sectional view illustrating a liner of a scavenging port portion, when viewed from the top, taken along line III-III of FIG. 4.
Figure 6A:
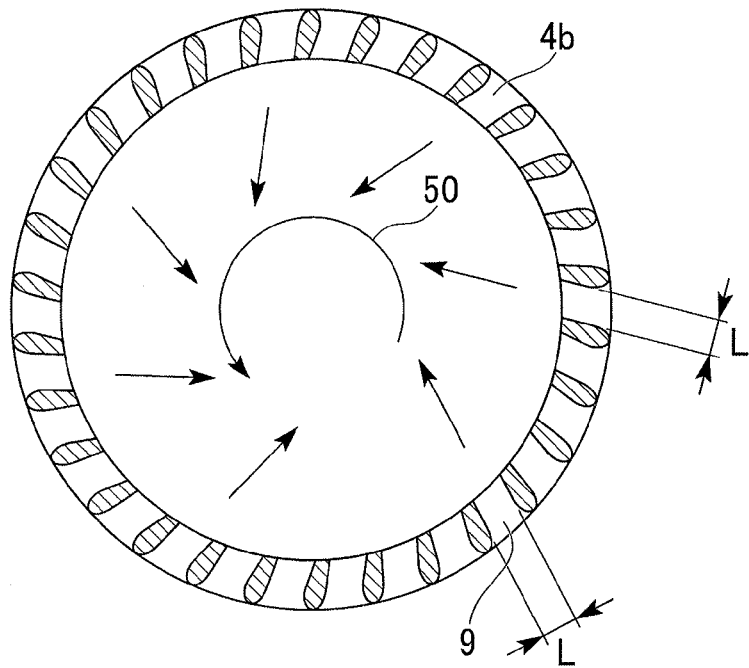

FIG. 5 is a cross-sectional view, when viewed from the top, taken along line II-II of FIG. 4. FIGS. 6A and 6B are cross-sectional views illustrating a liner of a scavenging port portion. FIG. 6A is a cross-sectional view, when viewed from the top, taken along line III-III of FIG. 4. FIG. 6B is a cross-sectional view illustrating a liner of a scavenging port portion according to the related art shown to compare with FIG. 6A. The following operation description will be given with reference to FIGS. 5, 6A, and 6B.

Next, an operation of the two-cycle engine having the following configuration will be described.

As shown in FIG. 4, the air supplied by the scavenging chamber 12 is introduced from the space 11 of the housing 10 into the cylinder liner 4b in a state in which the piston 3 is at the bottom dead center. At this time, since the internal combustion engine is in a state in which the exhaust valve 7 is opened in a scavenging state, a combustion gas remaining in the combustion chamber 100 is exhausted from the exhaust port 6 of the exhaust valve cage 55 to the outside by the introduced air.

In general (in the related art), during introduction of air, a swirl flow 50 of the air occurs within the cylinder liner 4b due to a shape in which each scavenging port 9 is inclined with respect to an axis of the cylinder liner 4b, as shown in FIG. 6B. Thereafter, when the piston 3 is raised (moves toward the combustion chamber 100) in the cylinder liner 4b and the scavenging port 9 is closed, the exhaust valve 7 becomes a closed state and the air introduced into the cylinder liner 4b is compressed. Since an angular momentum of the swirl flow 50 is preserved even under compression of the air, the swirl flow 50 does not disappear.

Here, the LNG is injected into the cylinder liner 4b from the fuel injection port 13 before the exhaust valve 7 is closed. The injection of the LNG is performed as described below, similarly to the related example. That is, after the LNG supplied from the LNG tank 160 is pressured using the LNG pump 31 driven by the electric motor 35 and is gasified by the evaporator 32, the LNG is injected from the fuel injection port 13 into the cylinder liner 4b via the gas controller 34 while the pressure of the LNG is regulated by the pressure regulating valve 33.

Furthermore, when specifically representing a drive condition of the two-cycle engine, an opening section of the scavenging port 9 is in a range of 100° to 260° at the crank angle from the TDC (Top Dead Center) of the piston 3, and an opening section of the exhaust valve 7 is in a range of 80° to 300° at the crank angle from the TDC (Top Dead Center) of the piston 3. In addition, an injection section of the LNG from the fuel injection port 13 is in a range of 220° to 330° at the crank angle from the TDC (Top Dead Center) of the piston 3 under a condition of closing the scavenging port 9 and opening the exhaust valve 7 during the scavenging stroke compressed by the piston 3.

Figure 8:
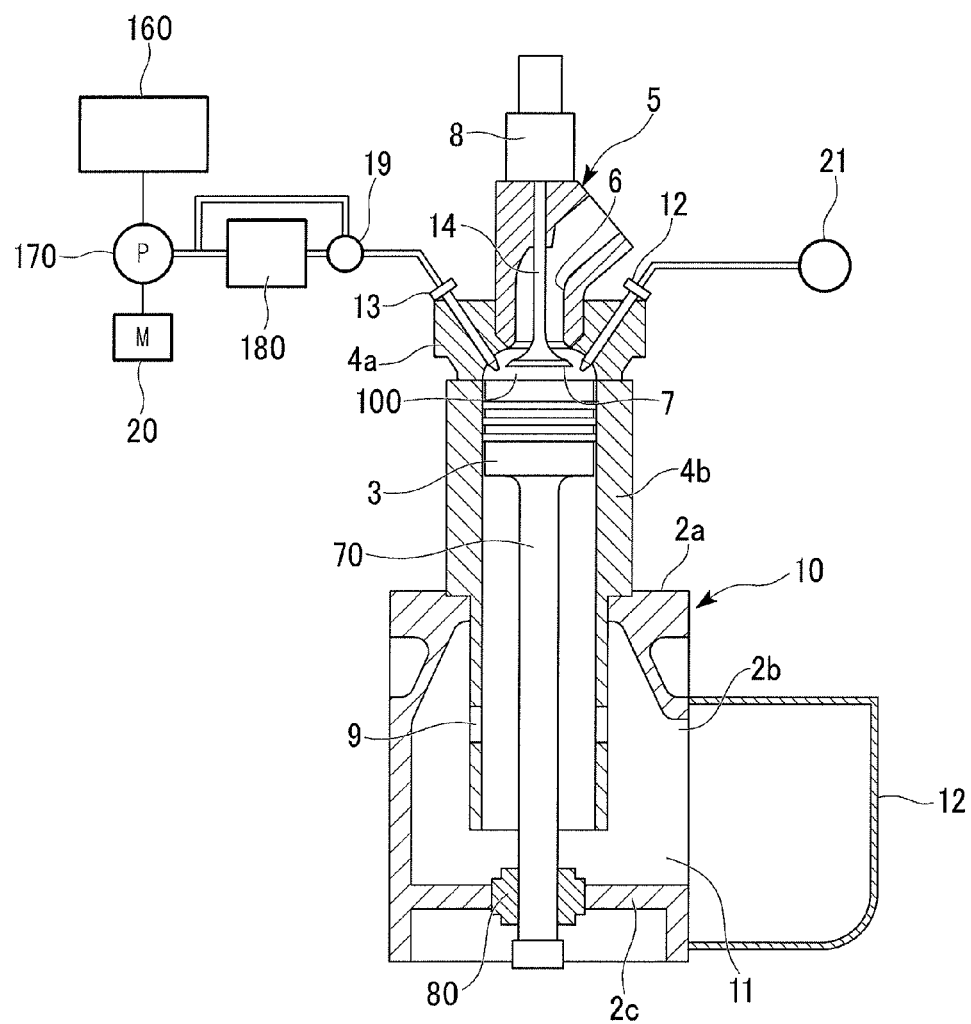
FIG. 8 is a view illustrating a schematic configuration at the time of gas combustion (explosion) in the two-cycle engine according to the related example.

In the two-cycle engine of the embodiment, since the LNG is supplied during the compression stroke (scavenging stroke) of the piston 3, the LNG does not need to be pressured to the high pressure of 250 bars by the LNG pump 31, similarly to being performed by the high pressure pump 170 of the related art shown in FIG. 8. The gas pressure pressured by the LNG pump 31 is approximately 20 bars, and thus a lower pressure may be applied compared to the related art. That is, the LNG pump 31 having a low capacity and low cost may be used compared to the high pressure pump 170 of the related art.

As shown in FIG. 5, the LNG is injected from the fuel injection port 13 in a direction opposite (opposite direction) to the swirl flow 50 (in an injection direction 51). Thus, the air and the LNG can be uniformly mixed by injecting the LNG in the direction opposite to the swirl flow 50. Meanwhile, as shown in FIG. 5, in the two-cycle engine of the embodiment, eight fuel injection ports 13 are mounted to the cylinder liner 4b at equal angles. The plural fuel injection ports 13 may be arranged in a vertical multistep fashion so that the air and the LNG are uniformly mixed.

In addition, in the two-cycle engine of the embodiment, the plural scavenging ports 9 are formed to have non-uniform opening widths (opening width L1>opening width L2) as shown in FIG. 6A. Thus, since flow velocities of air introduced from the respective scavenging ports 9 into the cylinder liner 4b differ from each other and a local turbulent flow occurs, the air and the LNG may be uniformly mixed.

Here, when both of the form of the injection direction 51 in FIG. 5 and the form in which the opening width of each scavenging port 9 is formed non-uniformly in FIG. 6A are adopted, an ideal mixing state of the air and the LNG can be obtained. However, an appropriate effect may be achieved even by adoption of any one of the two forms.

At the time of the piston 3 traversing the fuel injection ports 13 (at the time of the piston 3 closes the fuel injection ports 13), the gas controller 34 stops the supply of the LNG to the fuel injection ports 13. The liquid fuel supplied from a liquid fuel tank 22 is supplied to the pilot injection valve 5 via the fuel high pressure pipe 23 by the fuel injection pump 21 in a state in which the piston 3 reaches the top dead center and the mixed gas of the LNG and the air is compressed to the maximum. Then, the liquid fuel is injected from the pilot injection valve 5 toward the combustion chamber 100. The liquid fuel self-ignites within the combustion chamber 100 and this flame allows the compressed mixed gas to ignite (explode). By this explosive power (pressure), the piston 3 falls (moves toward the bottom dead center) at high speed in the cylinder liner 4b.

In addition, in the two-cycle engine of the embodiment, the crank angle detection sensor 37 detects the crank angle from a rotation position of the crank angle detection gear 40 attached to the cam shaft 39, and sends the detected signal to the control unit 38. The control unit 38 determines a timing which injects the LNG from each fuel injection port 13 based on the detected signal, and controls the injection beginning and stop of the LNG by the command to the gas controller 34.

In addition, the control unit 38 controls an air-fuel ratio of the mixed gas by regulating the pressure of the LNG based on a load state of the two-cycle engine or a scavenging pressure detected by the scavenging pressure sensor 36 mounted on the scavenging chamber 12. The control unit 38 may also electronically control the fuel injection pump 21 or the exhaust valve drive unit 8.

Since the two-cycle engine of the embodiment uses the LNG at the low pressure, a cheap LNG pump or evaporator may be adopted and costs can be reduced. In addition, since the low pressure LNG is used, it is possible to easily cope with a piping or a leakage of the gas and to improve stability. In addition, since the low pressure LNG is used, an operator can easily operate the engine. Furthermore, since the LNG is used as the main fuel, it is possible to improve an environment problem due to $SO_x$, $NO_x$, and $CO_2$.

Meanwhile, when the supply of the LNG by the fuel injection port 13 stops and only the liquid fuel is injected from the pilot injection valve 5, the two-cycle engine can also be driven as the diesel engine of the related art.

In addition, even in the second embodiment similar to the first embodiment, the fuel is not limited to the LNG and be generally applied to a flammable gas.

In accordance with the two-cycle engine according to the above-mentioned second embodiment, it is possible to obtain the same effect as the two-cycle engine according to the above-mentioned first embodiment.

INDUSTRIAL APPLICABILITY

The present invention provides a two-cycle engine capable of directly injecting fuel into a cylinder without using a high pressure while preignition is prevented.

In addition, the present invention can provide a two-cycle engine at low cost with high reliability.

REFERENCE SIGNS LIST

2: cylinder
6: exhaust port
9: scavenging port (air introduction hole)
13: fuel injection port
15: fuel injection control unit
A: exhaust gas layer
B: intake fresh air layer
C: premixed gas layer
4a: cylinder liner
12: scavenging chamber (air supply container)
3: piston
100: combustion chamber
5: pilot injection valve
7: exhaust valve
160: LNG tank
31: LNG pump
18, 32: evaporator
33: pressure regulating valve
34: gas controller
38: control unit
50: swirl flow
51: injection direction

The invention claimed is:

1. A two-cycle engine comprising:
an exhaust port which is opened and closed at one end portion in a longitudinal direction of a cylinder;
a scavenging port which is opened and closed at the other end portion in the longitudinal direction of the cylinder;
a fuel injection port which injects a fuel into the cylinder provided at an intermediate portion between said one end portion corresponding to the exhaust port, and said other end portion corresponding to the scavenging port,
wherein the fuel begins to be injected in a state in which at least any one of the exhaust port and the scavenging port is opened; and
a fuel injection control unit which is configured to control the fuel injection port to be in an open state before an exhaust gas in the cylinder is completely exhausted from the exhaust port and after an intake fresh air layer suctioned from the scavenging port into the cylinder reaches a fuel injection position of the fuel injection port.

2. The two-cycle engine according to claim 1,
wherein the fuel injection control unit is configured to control the fuel injection port to be in an open state after an intake fresh air layer suctioned from the scavenging port into the cylinder reaches a fuel injection position of the fuel injection port and after a delay time passes so that the intake fresh air layer is formed between an exhaust gas layer and the fuel injection position.

3. The two-cycle engine according to claim 1,
wherein the fuel injection control unit is configured to control the fuel injection port to be opened and closed based on an opening degree of at least any one of the exhaust port and the scavenging port.

4. The two-cycle engine according to claim 3,
wherein the fuel injection control unit is configured to control the fuel injection port to be opened and closed based on an opening degree of any one of the exhaust port and the scavenging port, which is opened later than the other one thereof.

5. The two-cycle engine according to claim 1, further comprising:
in the two-cycle engine using a flammable gas as a main fuel, a scavenging chamber in which a piston is reciprocally moved within the cylinder and which supplies air to the scavenging port formed on the cylinder, a combustion chamber provided at said one end portion of the cylinder, and a pilot injection valve which injects a liquid fuel which ignites a mixed gas of the flammable gas and the air within the combustion chamber,
wherein the fuel injection port is mounted to the cylinder above the scavenging port, and below the exhaust port and the pilot injection valve, and
the flammable gas is injected from the fuel injection port during a scavenging stroke which compresses the air supplied from the scavenging chamber by the piston.

6. The two-cycle engine according to claim 5,
wherein an injection of the flammable gas from the fuel injection port begins before an exhaust valve provided in the combustion chamber is closed, and stops in a state in which the piston closes the fuel injection port.

7. The two-cycle engine according to claim 5,
wherein the flammable gas is injected from the fuel injection port in a direction opposite to a swirl flow of the air generated during the scavenging stroke.

8. The two-cycle engine according to claim 5,
further comprising a plurality of scavenging ports, wherein scavenging ports have non-uniform opening widths.

9. The two-cycle engine according to claim 5,
further comprising a plurality of fuel injection ports, wherein the fuel injection ports are mounted to the cylinder in a multistep fashion.

* * * * *